US006418476B1

(12) United States Patent
Luciani

(10) Patent No.: US 6,418,476 B1
(45) Date of Patent: *Jul. 9, 2002

(54) METHOD FOR SYNCHRONIZING NETWORK ADDRESS TRANSLATOR (NAT) TABLES USING THE OPEN SHORTEST PATH FIRST OPAQUE LINK STATE ADVERTISEMENT OPTION PROTOCOL

(75) Inventor: James V. Luciani, Groton, MA (US)

(73) Assignee: Nortel Networks, Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,097

(22) Filed: Jun. 29, 1998

(51) Int. Cl.[7] .............................................. G06F 15/173
(52) U.S. Cl. ........................................ 709/238; 370/401
(58) Field of Search ................................. 709/238, 239, 709/240, 241, 242, 244, 245; 370/409, 401, 351, 389

(56) References Cited

U.S. PATENT DOCUMENTS

| | | | | |
|---|---|---|---|---|
| 5,793,763 A | * | 8/1998 | Mayes et al. | 370/389 |
| 5,917,820 A | * | 6/1999 | Rekhter | 370/392 |
| 6,028,848 A | * | 2/2000 | Bhatia et al. | 370/257 |
| 6,055,236 A | * | 4/2000 | Nessett et al. | 370/389 |
| 6,058,431 A | * | 5/2000 | Srisuresh et al. | 709/245 |
| 6,069,889 A | * | 5/2000 | Feldmann et al. | 370/351 |
| 6,119,171 A | * | 9/2000 | Alkhatib | 709/245 |

OTHER PUBLICATIONS

Michael Hasenstein, "IP Network Address Translation," http://www.suse.de/nmha/linux–ip–nat/diplon/mat.html, 1977.*
Egevang et al, "The IP Network Address Translator (NAT)," Network Working Group, RFC 1631, May 1994.*
R. Coltun, "The OSPF Opague LSA Option," Network Working Group, RFC 2370, Jul. 1998.*
Egevang, K. and Francis, P., "The IP Network Address Translator (NAT)," Request for Comments: 1631, http://info.internet.isi.edu/in–notes/rfc/files/rfc1631.txt, pp. 1–8, printed Aug. 19, 1998.
Moy, J., "OSPF Version 2,", Request for Comments: 1583, http://info.internet.isi.edu/in–notes/rfc/files/rfc1583.txt, pp. 1–170, printed Aug. 19, 1998.

* cited by examiner

Primary Examiner—Mehmet B. Geckil
(74) Attorney, Agent, or Firm—Blakely Sokoloff Taylor & Zafman LLP

(57) ABSTRACT

A method for distributing Network Address Translator (NAT) translation table information among border routers associated with a routing domain using the Open Shortest Path First (OSPF) Opaque Link State Advertisement (LSA) option protocol. The NAT translation table information is included in an application specific field following the LSA header. LS type 9 LSA packets are used to limit the flooding scope to the local network segments attached to the border router. Network address information, i.e., local network address and corresponding global network address, are transmitted in the application specific field of the Opaque LSA packet. The Opaque LSA packets are exchanged between a group of interconnected Opaque LSA capable border routers so that the border routers can maintain identical NAT translation tables as necessary to forward data packets according to the NAT forwarding paradigm.

16 Claims, 3 Drawing Sheets

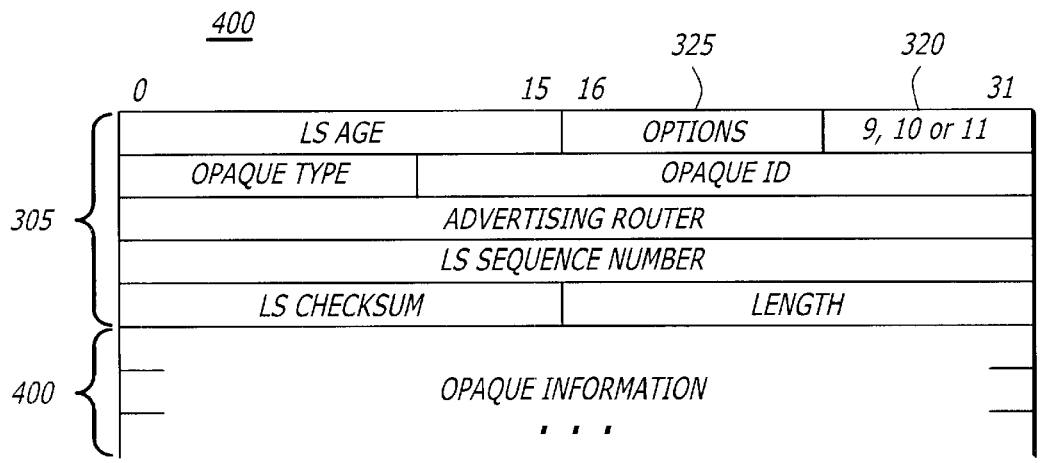
FIG. 4 (PRIOR ART)
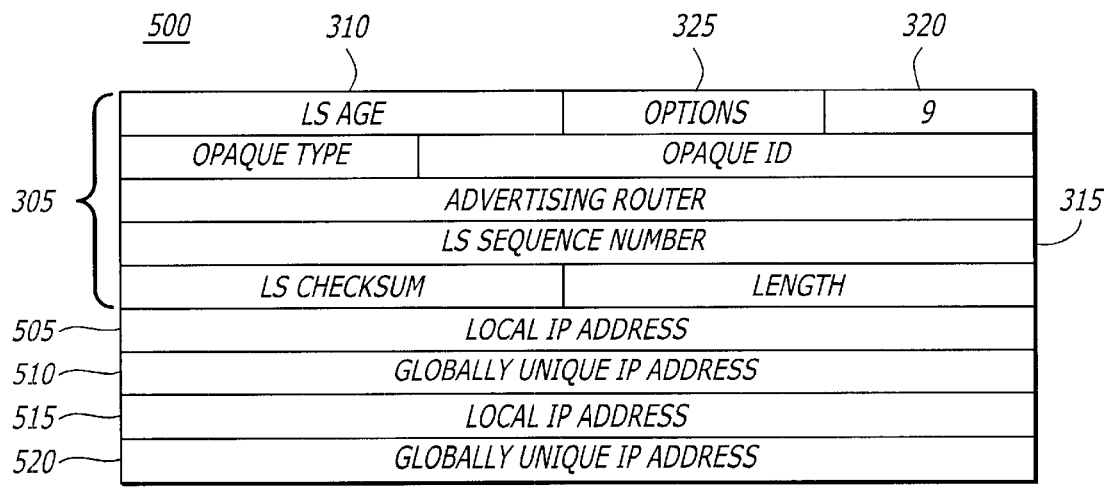
FIG. 5
| LOCAL IP | ADDRESS PORT | GLOBAL IP ADDRESS | PORT |
|---|---|---|---|
| 10.0.0.1 | 1 | 111.0.0.1 | 3 |
| 10.0.0.4 | 5 | 111.0.1.8 | 2 |
| 10.0.0.22 | 8 | 111.0.2.3 | 6 |
| ⋮ | ⋮ | ⋮ | ⋮ |
FIG. 6

METHOD FOR SYNCHRONIZING NETWORK ADDRESS TRANSLATOR (NAT) TABLES USING THE OPEN SHORTEST PATH FIRST OPAQUE LINK STATE ADVERTISEMENT OPTION PROTOCOL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to data communications. In particular, the present invention is related to a method for synchronizing Network Address Translator (NAT) tables, or databases, using the Open Shortest Path First (OSPF) Opaque Link State Advertisement (LSA) option protocol.

2. Description of the Related Art

The Transport Control Protocol/Internet Protocol (TCP/IP) suite of protocols is used in many of today's internetworks (internets). A TCP/IP-based internet provides a data packet switching system for communication between nodes (e.g., end-user workstations, servers, network devices, etc.) connected to an internet. With reference to FIG. 1, in accordance with the well known International Standards Organization (ISO) Open Systems Interconnection (OSI) seven-layer conceptual model for data networking, Network layer devices known as routers or switches select a path and forward, i.e., route, IP datagrams between nodes, or hosts, connected to the internet. For example, internet 100 comprises multiple networks, including Local Area Networks (LANs) 110, 120 and 170, and Wide Area Network (WAN) 180, interconnected by routers 130, 140, 150 and 160. The routers route IP datagrams, for example, between nodes 111, 112, 121, 122, and 171 via the multiple networks in the internet.

In traditional destination address based routing, a source node, e.g., node 111, transmitting an IP datagram to a destination node, e.g., node 121, specifies as a destination IP address the IP address of the destination node in the IP datagram. The IP datagram is encapsulated in a physical frame, or packet, and sent to the router attached to the same network (LAN 110) as the source node, e.g., router 130 or router 140. The router receiving the frame, in turn, extracts the IP datagram, and determines the destination IP address. The router selects the next hop router enroute to the destination node, e.g., router 160, and again encapsulates the datagram in a physical frame for transmission to the next hop router. This process continues until the IP datagram reaches the network to which the destination node is connected, i.e., LAN 120, wherein the datagram is delivered to the destination node 121.

Routing tables on each router store information about what networks are reachable, either directly or via adjacent routers. When a router receives an IP datagram, it compares the network portion of the IP destination address in the datagram, referred to herein as the address prefix, with the network reachability information stored in its routing table. If a match is found, the router sends the datagram over the appropriate, directly attached network to the next hop router through which the destination network is reachable, or directly to the node, if the destination network is directly attached to the router.

In the event of topological changes to network 100, network reachability information may be maintained up to date, automatically, through the use of an interior gateway protocol (IGP), such as the well known Open Shortest Path First (OSPF) Version 2 TCP/IP internet routing protocol, the specification of which is set forth in the Internet Standard Request For Comments (RFC) 1583, March, 1994. In addition to exchanging network reachability information between routers, the OSPF protocol routes IP datagrams over one of possibly multiple routes based on the destination IP address and IP Type of Service specified in the IP header of the datagrams. Further details of the well known OSPF version 2 routing protocol may be found in RFC 1583.

Growth of the Internet, as well as private internets, has placed demands not only on bandwidth requirements, but also the internet routing protocols and the available IP address space. Traditional destination address based routing using OSPF version 2 generally allows traffic to be routed based only on destination IP address and IP type of service. New approaches to routing and IP address allocation have been sought to improve routing functionality, scalability and control as changes in internet traffic patterns and volume emerge.

A particular problem for the Internet, and for which a number of proposals providing short-term and long-term solutions have been developed, is running out of unique IP addresses. One short term proposal is set forth in the Informational Request For Comments (RFC) 1631, May, 1994, entitled "The IP Network Address Translator (NAT)." The proposal is based on reuse of existing IP addresses by placing NAT software, and NAT tables or databases, at each router between routing domains. The NAT table at each participating router comprises pairs of local, reusable IP addresses for use in data packets transmitted within local routing domains, and assigned, globally unique IP addresses for use in data packets transmitted outside local routing domains, that is, over the Internet.

Briefly, network address translation functions as follows. With reference to FIG. 1, domains A, B, C and D represent separate routing domains. Routing domains A and B are stub, or leaf, domains, that only handle traffic originating from or destined to hosts in the routing domain, whereas routing domains C and D route traffic originating from or destined to hosts in the same or other routing domains. Most of the traffic in leaf routing domains is local, that is, at any given time, generally a small percentage of traffic originating from or destined to hosts in a leaf routing domain is transmitted outside the routing domain. Therefore, the local IP addresses assigned to hosts in one leaf routing domain may be reused by hosts in another leaf routing domain, without IP address conflict. A local IP address assigned to a host in a leaf routing domain needs only be translated to a globally unique IP address when the host communicates with a host outside the leaf routing domain. Thus, only a subset of the local IP addresses used in a leaf routing domain are translated to the globally unique IP addresses required when transmitting outside the leaf domain, thereby averting IP address depletion in the Internet.

Routers that provide ingress to or egress from a leaf routing domain are known as border routers. Network Address Translator (NAT) software, including NAT tables, is installed at these routers to provide the network address translator functionality. For example, routers 130, 140 and 150 are border routers for leaf routing domains that may utilize reusable local IP addresses.

According to the proposed NAT solution, host 111 can use a local IP address as the destination IP address when transmitting an IP datagram to host 112. However, host 111 must use a globally unique IP address as the destination IP address when sending an IP datagram to a host outside leaf routing domain A, e.g., host 121 in leaf routing domain B, via either of routers 130 and 140, say router 130. Router 130 checks its routing table, locates the route for the destination network specified by the globally unique destination IP address, and forwards the IP datagram to the next hop router via WAN 180, but not before replacing the local IP address of host 111 in the source IP address field of the datagram with a globally unique IP address. Ultimately, router 150 receives the IP datagram, and using its NAT software and associated data structures, translates the globally unique destination IP address with the local IP address assigned to host 121 in routing domain B before forwarding the datagram to host 121.

On the return path, the same process occurs: Host 121, for example, transmits to router 150 an IP datagram destined for host 111 in routing domain A, specifying the globally unique IP address for the host, as determined from the source IP address field in the IP datagram that host 121 received from host 111. The source IP address field in the return IP datagram contains the local IP address for host 121. Router 150 replaces the local IP address of host 121 in the source IP address field in the datagram with the appropriate globally unique IP address and forwards the datagram to the next hop router 160 via LAN 170. Upon receipt of the return IP datagram at either of router 130 or 140, say router 140, the globally unique destination IP address for host 111 is translated to a locally assigned IP address for host 111, and the datagram forwarded to host 111.

As can be appreciated, and as pointed out in RFC 1631, it is very important, if multiple border routers are coupled to a particular leaf routing domain, that the network address translation tables for each router are identical. In the above example, note that router 130 accessed its NAT translation table to translate the locally defined source IP address for host 111 to a globally unique source IP address. Router 140 performed the same but opposite translation when receiving an IP datagram from host 121 via WAN 180, destined for host 111: it exchanged the globally unique IP address specified in the destination IP address field in the datagram to a local IP address associated with host 111 before forwarding the datagram to host 111. If the translation tables for routers 130 and is 140 do not provide identical mappings between local and globally unique addresses, there is a likelihood that IP datagrams originating from or destined to hosts in leaf routing domain A do not reach the proper destination. Moreover, as the limited set of globally unique IP addresses are shared by the hosts in the routing domain and therefore the mappings between the globally unique IP address and the local IP address change over time, depending on which hosts are communicating over the Internet at any given time, it is important that routers 130 and 140 update the other as changes occur to their respective NAT tables. However, RFC 1631 makes no provision for such distribution of NAT translation tables between common border routers. What is needed, therefore, is a method of distributing such information.

BRIEF SUMMARY OF THE INVENTION

A method is described for synchronizing Network Address Translator (NAT) tables among. routers using the Open Shortest Path First (OSPF) Opaque Link State Advertisement (LSA) option protocol. The NAT table information is included in an application specific field following the LSA header. LS type 9 LSA packets are used to limit the flooding scope to the local network segments attached to the routers. Network address translator information, i.e., ingress IP address, ingress port, egress IP address and egress port, are transmitted in the application specific field of the Opaque LSA packet. The Opaque LSA packets are exchanged between a group of interconnected Opaque LSA capable routers so that the routers can maintain their NAT tables as necessary to exchange data packets with routers in other routing domains.

BRIEF SUMMARY OF THE SEVERAL VIEWS OF THE DRAWINGS

The present invention is illustrated by way of example and not limitation in the following figures, in which:

FIG. 4 illustrates the Opaque LSA option for an OSPF type 4 packet.

FIG. 5 illustrates an Opaque LSA packet format as may be utilized in an embodiment of the present invention.

FIG. 6 illustrates a format for a NAT translation table maintained in a border router.

DETAILED DESCRIPTION OF THE INVENTION

Figure 1:
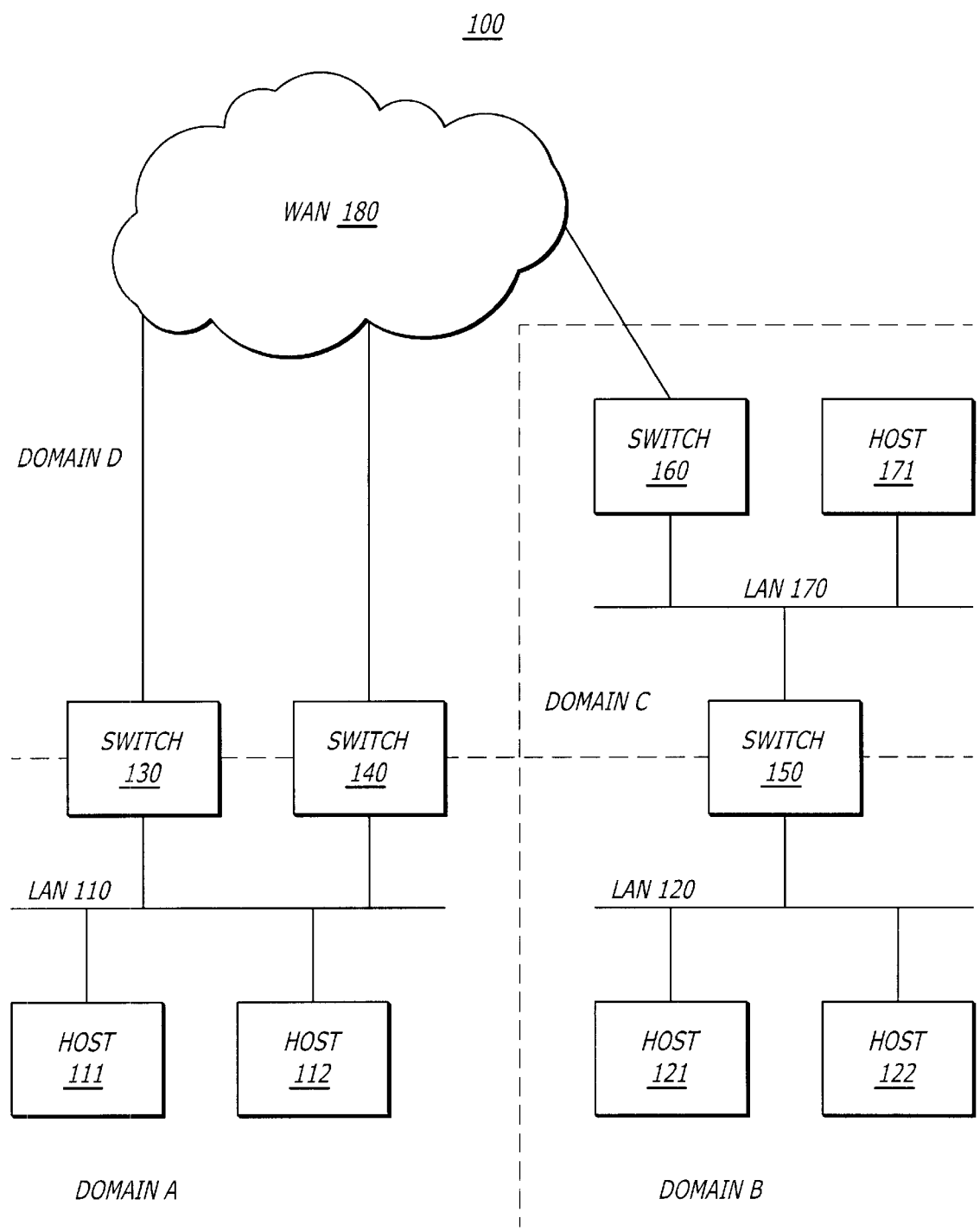
FIG. 1 is a diagram of a data communications internetwork.

Described is a method for distributing Network Address Translator (NAT) translation table information within a routing domain using the Open Shortest Path First (OSPF) Opaque Link State Advertisement (LSA) option protocol. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a router as a software routine, hardware circuit, firmware, or a combination thereof.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

The present invention is concerned with the particular method or protocol for exchanging Network Address Translator (NAT) translation table information between adjacent routers. While the description that follows specifically addresses the method as it applies to IP destination address based routing, it is appreciated by those of ordinary skill in the art that the method is generally applicable to distribution of network address translation information between networks that utilize different network addressing schemes. For example, the method is equally applicable in translating addresses from one format to another as required for communication between heterogeneous network architectures, protocols and addressing schemes.

FIG. 6 illustrates an embodiment of the NAT translation table 600 that resides in a border switch or router. The entries shown in FIG. 6 provide mappings as necessary to translate a local IP address 610 in a leaf routing domain to a globally unique IP address 620, and vise versa. Since routers have multiple ports, the table also maintains port information identifying the port 605 out which a node, e.g., a host, having the address is reachable, whether the originating or destination node. As described above in the background description of the invention, if a border router receives an IP datagram having a globally unique destination IP address, or local source IP address, the router checks its NAT translation table for the respective local destination IP address or globally unique source IP address, and exchanges such before forwarding the IP datagram. If there are multiple border routers for a given leaf routing domain, the NAT translation tables need to be synchronized. A protocol for doing such is described below.

Figure 2:
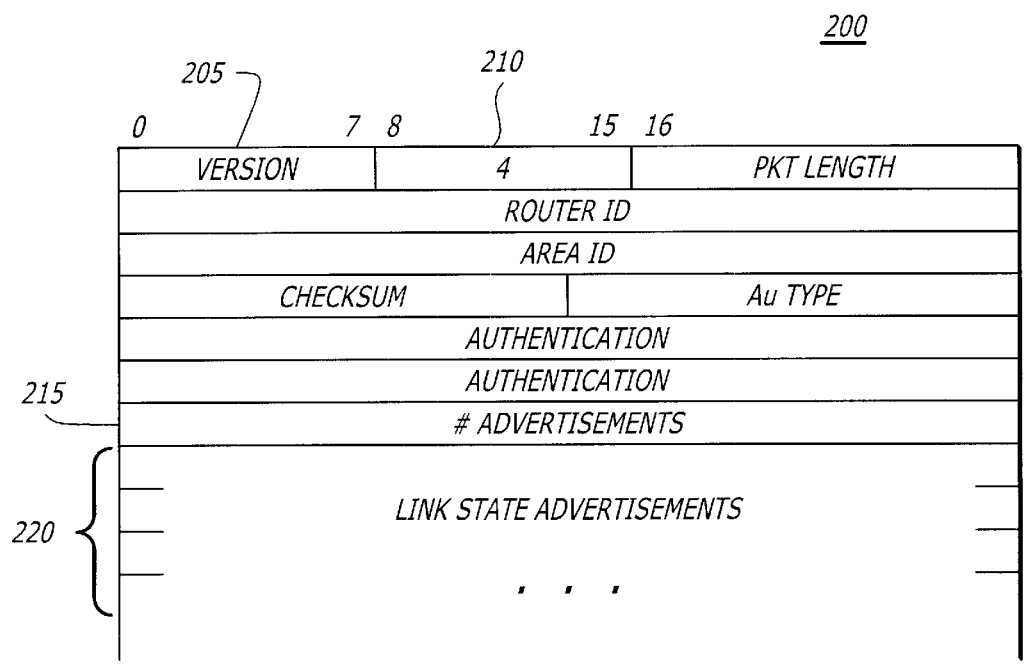
FIG. 2 illustrates the format of an OSPF type 4 packet.

An embodiment of the present invention distributes Network Address Translator (NAT) translation table information in the above described manner using the Open Shortest Path First (OSPF) Opaque Link State Advertisement (LSA) optional protocol. With reference to FIG. 2, the format for an OSPF Link State Advertisement (LSA) packet 200 is illustrated. Link state advertisement packets are multicast or broadcast on physical network segments to flood the link state advertisements to adjacent routers in the routing domain. Following the OSPF version field 205 is the OSPF packet type field 210, set to 4. Each LSA packet may contain a number of link state advertisements, as indicated in the "#Advertisements" field 215, with the actual link state advertisements 220 following field 215 in the packet.

Figure 3:
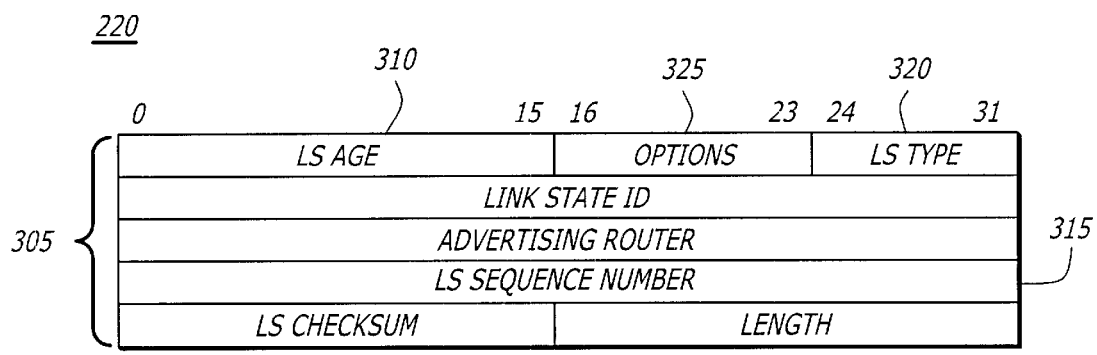
FIG. 3 illustrates the link state advertisement header within an OSPF type 4 packet.

As shown in FIG. 3, each link state advertisement 220 begins with a 20 byte link state advertisement header 305 that uniquely identifies the link state advertisement. The most recent of potentially multiple copies of the same link state advertisement are distinguished by the link state age (LS age) field 310 and link state sequence number (LS sequence number) field 315. As indicated by the LS type field 320, there are multiple types of link state advertisement packets. The contents of LS type field govern the format of the body of the link state advertisement packet that follows the header 305. For example, LS types 9, 10 or 11 indicate the Opaque LSA option packet type, the format of which is illustrated in FIG. 4.

Opaque LSAs 400 begin with the standard link state advertisement header 305, followed by a 32-bit aligned information field 400 that contains application specific information which may be utilized by OSPF or other applications. Opaque LSAs are flooded throughout the internet in the same manner as other LSAs according to the well-known link-state database distribution mechanism used by OSPF. The contents of the LS type field 320 define the range of distribution, or flooding scope, for Opaque LSAs: type 9 Opaque LSAs are flooded throughout the local network or subnetwork (scope "link-local"); type 10 Opaque LSAs are flooded throughout an interior routing area defined by the OSPF routing protocol (scope "area-local"); and type 11 Opaque LSAs are flooded throughout an autonomous system. As seen in FIG. 5, an embodiment of the present invention uses type 9 Opaque LSAs to exchange NAT translation table information between adjacent Opaque LSA capable routers attached to the same local (sub)networks. (An Opaque capable router determines whether an adjacent router is Opaque-capable through receipt of an OSPF Database Description packet, sent during the Database Exchange Process, in which the O-bit (Opaque bit) in the options field 325 is set.)

FIG. 5 illustrates the format of an Opaque LSA packet 500 as embodied by the present invention. The Opaque LSA packet 500 begins with the standard link state advertisement header 305, followed by NAT translation table information contained in fields 505–520. The first field 505 contains a local IP address, followed by a second field 510 that contains a corresponding globally unique IP address. In an alternative embodiment, the order of fields 505 and 510 may be reversed. The following two fields 515 and 520 are the same as the first two fields, and correspond to the next entry in the NAT translation table, i.e., they contain the local IP address and globally unique IP address into/from which the local IP address is translated. The Opaque LSA type 9 packets are flooded throughout the link-local, i.e., attached network segments, in the same manner as other LSAs according to the OSPF protocol.

In the network diagram illustrated in FIG. 1, routers 130 and 140 exchange NAT translation table information using the above OSPF Opaque LSA protocol format.

Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described above for synchronizing network address translation tables can be stored on the machine-readable medium. Those of ordinary skill in the art will appreciate that other instructions and operations necessary to implement the described invention may also be stored on the machine-readable medium.

What is claimed is:

1. A method for a border router associated with a routing domain to distribute network address translator (NAT) translation table information to interconnected border routers in the routing domain, comprising the steps of:
   a) inserting the NAT translation table information into an Open Shortest Path First (OSPF) Opaque Link State Advertisement (LSA) packet; and
   b) distributing the OSPF Opaque LSA packet to the interconnected border routers.

2. The method of claim 1, wherein inserting the NAT translation table information into an OSPF Opaque LSA packet comprises inserting the NAT translation table information into an application specific field of the OSPF Opaque LSA packet.

3. The method of claim 2, wherein inserting NAT translation table information into an application specific field of the OSPF Opaque LSA packet, comprises:
   a) inserting a local network address into a first field of the application specific field; and b) inserting a corresponding globally unique IP address into a second field of the application specific field.

4. The method of claim 1, wherein distributing the OSPF Opaque LSA packet to the interconnected border routers, comprises:
   a) setting the flooding scope for the OSPF Opaque LSA packet to local network segments; and
   b) advertising the OSPF Opaque LSA packet to the interconnected border routers within the flooding scope.

5. A method for distributing network address translation information from a first network device to a second network device, comprising:
   at the first network device, providing a data unit that includes both network address translation information and at least some network topology information, the data unit is an Open Shortest Path First (OSPF) Opaque Link State Advertisement (LSA) packet;
   transmitting the data unit from the first network device to the second network device; and
   at the second network device, employing the network address translation information from the data unit to update any existing network address translation information.

6. The method of claim 5, wherein the transmitting of the data unit step further includes the steps of:
   setting a flooding scope for the OSPF Opaque LSA packet to local network segments; and
   advertising the OSPF Opaque LSA packet to interconnected border network devices within the flooding scope.

7. A data structure embodied in software stored on the machine-readable medium for distributing network address translation information from a first network device to a second network device in a computer network, comprising:
   at least one field containing link state information that indicates reachability of at least one device in the computer network; and
   at least one application specific field that contains Network Address Translator (NAT) translation table information.

8. The data structure embodied in software stored on the machine-readable medium of claim 7, wherein said network address translation information includes at least one local network address and at least one corresponding globally unique network address.

9. The data structure embodied in software stored on the machine-readable medium of claim 7, wherein the globally unique network address is an Internet Protocol (IP) address.

10. The data structure embodied in software stored on the machine-readable medium of claim 7, wherein the local network address is an Internet Protocol (IP) address.

11. A network device for distributing network address translation information to at least one other network device, comprising:
   a plurality of ports;
   interconnection circuitry that facilitates transmission of data units between the plurality of ports within the network device, the data unit includes an Open Shortest Path First (OSPF) Link State Advertisement (LSA) packet;
   circuitry that provides a data unit that includes both network address translation information and at least some network topology information; and
   circuitry that prompts transmission of the data unit to the at least one other network device via at least one of the ports.

12. The network device of claim 11, including circuitry that places a local Internet Protocol (IP) address into a first field of the packet and a corresponding globally unique IP address into a second field of the packet.

13. The network device of claim 12, wherein the network device includes a network border router.

14. The network device of claim 13, wherein the network device includes a network switch.

15. A method for distributing network address translation information from a first network device to a second network device, comprising:
   at the first network device, providing a data unit that includes both network address translation information and at least some network topology information, the providing of the data unit includes inserting Network Address Translator (NAT) translation table information into an application specific field of an Open Shortest Path First (OSPF) Opaque Link State Advertisement (LSA) packet;
   transmitting the packet from the first network device to the second network device; and
   at the second network device, employing the network address translation information from the packet to update any existing network address translation information.

16. The method of claim 15, wherein the providing of the packet includes:
   inserting a local network address into a first portion of an application specific field of the data unit; and
   inserting a corresponding globally unique Internet Protocol (IP) address into a second portion of the application specific field.

* * * * *